United States Patent [19]

Hoch et al.

[11] 4,431,824
[45] Feb. 14, 1984

[54] PREPARATION OF 4,4',7,7'-TETRACHLOROTHIOINDIGO PIGMENTS OF HIGH COLOR STRENGTH

[75] Inventors: Helmut Hoch; Heinrich Hiller, both of Wachenheim, Fed. Rep. of Germany

[73] Assignee: BASF Aktiengesellschaft, Ludwigshafen, Fed. Rep. of Germany

[21] Appl. No.: 337,498

[22] Filed: Jan. 6, 1982

[30] Foreign Application Priority Data

Jan. 22, 1981 [DE] Fed. Rep. of Germany ....... 3101873

[51] Int. Cl.$^3$ .................... C07D 333/64; C09B 7/10
[52] U.S. Cl. ...................................................... 549/56
[58] Field of Search ......................................... 549/56

[56] References Cited

U.S. PATENT DOCUMENTS 2,158,032 1/1981 Lubs et al. ............................. 549/56
2,804,464 8/1957 Kaplan et al. ..................... 549/56 X
4,229,583 10/1980 Spietschka et al. .................. 549/52
4,260,778 4/1981 Schütze et al. ....................... 549/52

FOREIGN PATENT DOCUMENTS

| 194237 | Fed. Rep. of Germany . |
| 197162 | Fed. Rep. of Germany . |
| 241910 | Fed. Rep. of Germany . |
| 389649 | France . |
| 2300117 | France . |
| 1463229 | United Kingdom . |
| 2022606 | United Kingdom . |

Primary Examiner—Richard Raymond
Attorney, Agent, or Firm—Oblon, Fisher, Spivak, McClelland & Maier

[57] ABSTRACT 4,4',7,7'-Tetrachlorothioindigo pigments of high color strength are prepared by oxidizing 3-hydroxy-4,7-dichlorothionapthene or a mixture of tetrachlorothioindigo and hydroxydichlorothionaphthene in aqueous alkaline suspension with a salt of a nitro-aromatic sulfonic acid, in the presence of a high-boiling, water-immiscible or only slightly water-miscible aromatic liquid, at from 40° to 100° C., and heating the organic suspension to 110°–180° C. Pigmentary forms of tetrachlorothioindigo are isolated which give deep colorations of high brilliance when reduced with white pigments.

15 Claims, No Drawings

PREPARATION OF 4,4',7,7'-TETRACHLOROTHIOINDIGO PIGMENTS OF HIGH COLOR STRENGTH

The present invention relates to a process for the preparation of 4,4',7,7'-tetrachlorothioindigo pigments of high color strength.

4,4',7,7'-Tetrachlorothioindigo, hereafter referred to as tetrachlorothioindigo, is a valuable colorant for surface coatings and plastics, owing to its good fastness properties.

A number of processes have been disclosed for the preparation of thioindigo and its chlorine derivatives. As a rule, the preparation is carried out by oxidizing the corresponding 3-hydroxythionaphthenes. According to U.S.S.R. Pat. No. 327,218, a mixture of 3-hydroxy-4,7-dichlorothionaphthene and tetrachlorothioindigo is obtained by cyclization of 2,5-dichlorophenylthioglycolic acid in chlorosulfonic acid. Pure 3-hydroxy-4,7-dichlorothionaphthene is obtained by cyclization of 2,5-dichlorophenylthioglycolic acid chloride with aluminum chloride (German Pat. No. 197,162), with aluminum chloride in an inert organic solvent (U.S. Pat. No. 2,158,032) or with a mixture of aluminum halide, an alkali metal halide and sulfur dioxide (German Laid-Open Application DOS 2,825,513).

3-Hydroxy-4,7-dichlorothionaphthene, also referred to hereafter as hydroxydichlorothionaphthene, can be oxidized with sodium polysulfide, as described in U.S. Pat. No. 2,158,032, with air, iron(III) chloride, potassium cyanoferrate(III) or potassium dichromate, as described in German Pat. No. 194,237, or with a peroxydisulfate in aqueous alkaline suspension, as described in German Laid-Open Application DOS 2,504,935.

German Pat. No. 241,910 discloses that tetrachlorothioindigo can be prepared directly from 2,5-dichlorophenylthioglycolic acid in chlorosulfonic acid at 35° C., without isolating hydroxydichlorothionaphthene. According to German Laid-Open Application DOS 2,825,313, page 1, lines 10/13, the resulting tetrachlorothioindigo, owing to the presence of by-products, is of only limited use and unsuitable, for example, as a surface-coating pigment.

German Laid-Open Application DOS 2,457,703 discloses the direct preparation of a pigmentary form of tetrachlorothioindigo by oxidation of hydroxydichlorothionaphthene with oxygen in aqueous alkaline or aqueous alkaline organic suspension. When we repeated this process, the pigment obtained gave dull and pale colorations.

Many of the conventional processes are uneconomical and/or ecologically unacceptable. For example, the oxidation, described in U.S. Pat. No. 2,158,032, of hydroxydichlorothionaphthene with sodium polysulfide gives unsatisfactory yields, according to the data in German Published Application DAS 2,504,935, column 1, lines 3/37. In addition, the effluent produced contains large amounts of sulfur compounds and must therefore be specially treated.

In the oxidation of hydroxydichlorothionaphthene with iron(III) chloride, a hexacyanoferrate(III) or potassium dichromate, the resulting heavy metal-containing tetrachlorothioindigo has to be treated in an additional step to remove heavy metal compounds.

The oxidation of hydroxydichlorothionaphthene with air, as described in German Pat. No. 194,237, has to be carried out in low concentration. According to the data in German Published Application DAS 2,504,935, column 1, lines 40/43, only a low yield is obtained by this process. Although the yield in the oxidation with air is significantly improved by the addition of copper or other heavy metal salts (German Laid-Open Application DOS 2,457,703), it reaches only from 76 to 78% of the theoretical yield in the case of hydroxydichlorothionaphthene. This is significantly lower than the yields obtainable with potassium dichromate or potassium permanganate, and an additional step is again necessary to separate off the heavy metals.

According to the data in German Published Application DAS 2,504,935, column 2, lines 12/16, oxidation with hydrogen peroxide, sodium peroxide and perborate also leads to significantly lower yields, a fact which was confirmed when we repeated the process.

According to the data in German Published Application DAS 2,504,935, Examples 1 to 6, the oxidation of hydroxydichlorothionaphthene with a peroxydisulfate gives tetrachlorothioindigo in 87–97% yield. However, the resulting crude pigment on finishing only gives pigmentary forms, which produce bluishly dull colorations. This result indicates that by-products are formed during the oxidation with peroxydisulfate and cause the pronounced shift in hue and the dullness.

It is an object of the present invention to develop a process for the preparation of 4,4',7,7'-tetrachlorothioindigo, in a pigmentary form of high color strength, directly from 3-hydroxy-4,7-dichlorothionaphthene.

We have found that this object is achieved and that 4,4',7,7'-tetrachlorothioindigo pigments of high color strength are obtained when 3-hydroxy-4,7-dichlorothionaphthene or a mixture of 3-hydroxy-4,7-dichlorothionaphthene and 4,4',7,7'-tetrachlorothioindigo in aqueous alkaline suspension, which contains from 0.5 to 10% by weight, based on the aqueous suspension, of an alkali metal hydroxide, is oxidized with a salt of a nitroaromatic sulfonic acid in the presence of a high-boiling water-immiscible or only slightly water-miscible aromatic liquid at from 40° to 100° C., the suspension is neutralized after completion of oxidation, and either the water is separated off from the aqueous organic suspension and the suspension is heated to 110°–180° C., or the water is distilled off from the aqueous organic suspension, the organic suspension is heated to 110°–180° C., and the pigment is then isolated.

The process of the present invention gives tetrachlorothioindigo pigmentary forms, of high color strength, which can be adjusted to range from transparent to opaque, depending on the conditions of recrystallization. Very pure tetrachlorothioindigo is obtained by the process.

The formation, from the oxidation mixture, of such tetrachlorothioindigo pigmentary forms giving deep colorations of high brilliance was not to be expected, and is possible only when the oxidation is carried out with an aromatic nitrosulfonic acid. It is also surprising that pure pigmentary forms of high color strength are obtained despite the presence of salts and of the reduction products of the nitrosulfonic acid.

In general, the process is carried out as follows: the 3-hydroxy-4,7-dichlorothionaphthene or a mixture of 3-hydroxy-4,7-dichlorothionaphthene and tetrachlorothioindigo is suspended in from 3 to 20 times its weight of water, and from 0.5 to 10, preferably from 2 to 5, % by weight, based on the suspension, of an alkali metal hydroxide is added to the suspension. The nitroaromatic sulfonic acid, for example in the form of an alkali metal salt, and the high-boiling, water-immiscible or only slightly water-miscible liquid are then added, and oxidation is carried out, with stirring, at from 40° to 100° C., preferably from 50° to 80° C. When the oxidation has ended, ie. 3-hydroxydichlorothionaphthene can no longer be detected by thin layer chromatography, the mixture is neutralized with a mineral acid, preferably sulfuric acid. The pigmentary form can be conditioned by first separating off the water and then heating the organic suspension to 110°-180° C. to distill off residual water. In a preferred procedure, the water is first distilled off or removed from the neutral aqueous-organic suspension, and the organic suspension is then heated to 110°-180° C. and kept at the chosen temperature in general for from 3 to 20, in particular for from 4 to 15, hours.

Thereafter, the pigment is isolated from the organic liquid in a conventional manner, for example by filtering off under suction and washing the residue with a water-miscible solvent and finally with water, after which the residue may be dried.

The organic liquid can also be removed from the organic pigment suspension or from the residue by passage of steam, and the pigment isolated from the aqueous suspension.

The amount of water present during oxidation is not critical, and is in general from 3 to 20 times, preferably from 4 to 8 times, the amount of starting compound or starting compound mixture. To achieve high space/time yields, no more than the required amount of water should be used.

From 10 to 50% by weight, based on 3-hydroxy-4,7-dichlorothionaphthene or the tetrachlorothioindigo/-hydroxydichlorothionaphthene mixture, of a nitroaromatic sulfonic acid is employed.

Suitable nitro-aromatic sulfonic acids are nitrobenzenesulfonic acids and nitrophenolsulfonic acids which are unsubstituted or substituted by $C_1$–$C_4$-alkyl.

For economic reasons, nitrotoluenesulfonic acid and in particular m-nitrobenzenesulfonic acid are preferred as oxidants.

The nitrosulfonic acid is advantageously employed in the form of its alkali metal salt solution.

Suitable high-boiling, water-immiscible or only slightly water-miscible aromatic liquids are alkylbenzenes, the chlorobenzenes, chlorotoluene and aromatic nitrohydrocarbons. Specific examples are xylene, chlorobenzene, o-dichlorobenzene, trichlorobenzene, chlorotoluene, nitrobenzene and nitrotoluene, nitrobenzene being preferred.

By varying the temperature and the duration of heating in the aromatic liquid, the tinctorial properties of the pigmentary form can be controlled, for example to give pigments which, at full shade, produce more transparent or more opaque colorations.

Pigmentary forms which, at full shade, give more transparent colorations are obtained by heating the pigment in the aromatic liquid at from 110° to 130° C. for from 4 to 8 hours.

Colorations which are more opaque at full shade are obtained with tetrachlorothioindigo pigments which have been heated in the aromatic liquid at from 140° to 160° C. for from 6 to 15 hours.

When reduced with white pigments, the pigmentary forms obtained by the novel process give deep colorations of high brilliance.

Furthermore, by varying the temperature and the duration of heating, the hue of the pigmentary form can be made yellower or bluer. Thus, at higher temperatures and for longer periods of heating, for example at 150° C. for 10 hours, the hue becomes more bluish, and at lower temperatures and for shorter periods of heating, for example at 120° C. for 6 hours, the hue becomes more yellowish.

The pigments obtained by the process of the present invention are superior to the pigments of the prior art in one or more of the following properties: brilliance, color strength and dispersibility.

The Examples which follow illustrate the process of the invention. Parts and percentages are by weight.

EXAMPLE 1

(a) 850 parts of chlorosulfonic acid were cooled to 0° C., and 100 parts of 2,5-dichlorophenylthioglycolic acid were then introduced, in the course of 1 hour, in such a manner that the temperature was kept at from 0° to 5° C. by cooling. The mixture was stirred for 5 hours at from 0° to 5° C., and thereafter the suspension was precipitated by pouring onto 25,000 parts of ice, with stirring. The precipitated 4,4',7,7'-tetrachlorothioindigo/3-hydroxy-4,7-dichlorothionaphthene mixture was isolated by filtration and washed neutral with water at 20° C. The mixture was processed further as an aqueous paste.

(b) 30 parts of the 4,4',7,7'-tetrachlorothioindigo/3-hydroxy-4,7-dichlorothionaphthene mixture from (a), in the form of the press cake, were stirred with water to give a 20% strength aqueous suspension, and 7 parts of 50% strength sodium hydroxide solution were added. 9 parts of sodium 3-nitrobenzenesulfonate and 210 parts of nitrobenzene were added, and the mixture was heated to 65° C. and kept at this temperature for 2 hours. The mixture was then adjusted to pH 6.8 with 50% strength sulfuric acid, after which it was heated to 140° C. in the course of about 1 hour, water being distilled off (120 parts together with about 20 parts of nitrobenzene). The mixture was stirred for 6 hours at 140° C. and then cooled to about 70° C., and the pigment was filtered off, and washed with a little nitrobenzene. The residual nitrobenzene was washed out with 200 parts of methanol, after which the methanol and the precipitated salts were removed by washing with water at 60° C. The pigment was dried and powdered. Yield: 29 parts of a reddish-violet 4,4',7,7'-tetrachlorothioindigo pigment which gives opaque colorations at full shade in baking finishes, and deep, brilliant colorations as a white reduction with titanium dioxide.

EXAMPLE 2

30 parts of the 4,4',7,7'-tetrachlorothioindigo/3-hydroxy-4,7-dichlorothionaphthene mixture from Example 1(a) were stirred with water to give a 23% strength suspension (130 parts), and 7 parts of 50% strength sodium hydroxide solution were added. Thereafter, 10 parts of sodium 3-nitrobenzenesulfonate and 200 parts of nitrobenzene were added, and the mixture was kept at 65° C. It was then adjusted to pH 6.8 with 50% strength sulfuric acid, after which it was heated to 125° C., 100 parts of water and 10 parts of nitrobenzene being distilled off. The mixture was stirred for 6 hours at 125° C. and then cooled to about 70° C., and the pigment was filtered off and washed with a little nitrobenzene. The residual nitrobenzene was washed out with 200 parts of methanol, after which the methanol and the precipitated salts were removed by washing with water at 60° C. The pigment was dried and powdered. Yield: 29 parts of a tetrachlorothioindigo pigment which, at full shade in baking finishes, gives more transparent colorations than the pigment of Example 1(b), and, in a white reduction with titanium dioxide, gives deep, brilliant colorations which have a distinctly yellower hue than the pigment of Example 1.

EXAMPLE 3

30 parts of the 4,4',7,7'-tetrachlorothioindigo/3-hydroxy-4,7-dichlorothionaphthene mixture from Example 1(a), in the form of the press cake, were stirred with water to give a 20% strength suspension (150 parts), and 7 parts of 50% strength sodium hydroxide solution were added. 9 parts of sodium 4-nitro-2-methylbenzenesulfonate and 200 parts of o-dichlorobenzene were introduced, and the mixture was heated to 65° C. and kept at this temperature for 1.5 hours. Thereafter, the mixture was adjusted to pH 7 with 50% strength sulfuric acid, after which it was heated to 130° C. in the course of about 1 hour, water being distilled off. The mixture stirred for 5 hours at 130° C., cooled to 70° C., and worked up in a similar manner to that of Example 2. Yield: 28.5 parts of a tetrachlorothioindigo pigment which has similar tinctorial properties to the pigment of Example 2.

EXAMPLE 4

30 parts of the 4,4',7,7'-tetrachlorothioindigo/3-hydroxy-4,7-dichlorothionaphthene mixture from Example 1(a), in the form of the press cake, were stirred with water to give a 21.5% strength suspension (140 parts), and 6 parts of 50% strength sodium hydroxide solution were added. 8.5 parts of sodium 3-nitrobenzenesulfonate and 180 parts of o-nitrotoluene were added, and the mixture was heated to 70° C. and kept at this temperature for 1 hour. Thereafter, it was adjusted to pH 7 with 75% strength sulfuric acid, and heated to 150° C. in the course of about 45 minutes, water being distilled off. The mixture was then stirred for 6 hours at 150° C., cooled to 70° C., and worked up in a manner similar to that of Example 2. Yield: 28 parts of a tetrachlorothioindigo pigment which has similar tinctorial properties to the pigment of Example 1.

EXAMPLE 5

22 parts of 3-hydroxy-4,7-dichlorothionaphthene (obtained from 2,5-dichlorophenylthioglycolic acid, as described in Example 2 of U.S. Pat. No. 2,158,032) were suspended in 90 parts of water and 10 parts of 50% strength sodium hydroxide solution. 11 parts of sodium 3-nitrobenzenesulfonate and 110 parts of nitrobenzene were added, and the mixture was heated to 70° C. and kept at this temperature for ¾ hour. Thereafter, it was adjusted to pH 7 with 75% strength sulfuric acid, and was heated to 145° C. in the course of about 1 hour, water being distilled off. The mixture was then stirred for 5 hours at 145° C., cooled to 70° C. and worked up in a manner similar to that of Example 1. Yield: 20 parts of a 4,4',7,7'-tetrachlorothioindigo pigment which has similar tinctorial properties to the pigment of Example 1.

We claim:

1. A process for the preparation of 4,4',7,7'-tetrachlorothioindigo pigments of high color strength, which comprises oxidizing 3-hydroxy-4,7-dichlorothionaphthene or a mixture of 3-hydroxy-4,7-dichlorothionaphthene and 4,4',7,7'-tetrachlorothioindigo in aqueous-alkaline suspension, which contains from 0.5 to 10% by weight, based on the aqueous suspension, of an alkali metal hydroxide, with a salt of a nitro-aromatic sulfonic acid in the presence of a high-boiling water-immiscible or only slightly water-miscible aromatic liquid at from 40° to 100° C., neutralizing the suspension after the end of the oxidation, removing the water from the aqueous organic suspension by separation or distillation, and heating the organic suspension to 110°–180° C., thereby isolating said pigment.

2. The process as claimed in claim 1, wherein the water is removed by distillation from the neutral aqueous-organic suspension, and the organic suspension is heated to 100°–180° C., thereby isolating said pigment.

3. The process as claimed in claim 1 or 2, wherein the oxidation is carried out in an aqueous suspension which contains from 2 to 5% by weight, based on the aqueous suspension of the starting material, of an alkali metal hydroxide.

4. The process as claimed in claim 1 or 2, wherein the oxidation is carried out using from 10 to 50% by weight, based on 3-hydroxy-4,7-dichlorothionaphthene or the 3-hydroxy-4,7-dichlorothionaphthene/tetrachlorothioindigo mixture, of an alkali metal salt of a nitro-aromatic sulfonic acid.

5. The process as claimed in claim 3, wherein the oxidation is carried out using from 10 to 50% by weight, based on 3-hydroxy-4,7-dichlorothionaphthene or the 3-hydroxy-4,7-dichlorothionaphthene/tetrachlorothioindigo mixture, of an alkali metal salt of a nitro-aromatic sulfonic acid.

6. The process as claimed in claim 1 or 2, wherein the high-boiling aromatic liquid used is from 5 to 10 times the weight of the 3-hydroxy-4,7-dichlorothionaphthene or the 3-hydroxy-4,7-dichlorothionaphthene/tetrachlorothioindigo mixture.

7. The process as claimed in claim 3, wherein the high-boiling aromatic liquid used is from 5 to 10 times the weight of the 3-hydroxy-4,7-dichlorothionaphthene or the 3-hydroxy-4,7-dichlorothionaphthene/tetrachlorothioindigo mixture.

8. The process as claimed in claim 5, wherein the high-boiling aromatic liquid used is from 5 to 10 times the weight of the 3-hydroxy-4,7-dichlorothionaphthene or the 3-hydroxy-4,7-dichlorothionaphthene/tetrachlorothioindigo mixture.

9. The process as claimed in claim 1 or 2, wherein nitrobenzenesulfonic acid or nitrophenolsulfonic acid, which is unsubstituted or substituted in the benzene ring by $C_1$–$C_4$-alkyl, is used as the nitro-aromatic sulfonic acid.

10. The process as claimed in claim 8, wherein nitrobenzenesulfonic acid or nitrophenolsulfonic acid, which is unsubstituted or substituted in the benzene ring by $C_1$–$C_4$-alkyl, is used as the nitro-aromatic sulfonic acid.

11. The process as claimed in claim 1 or 2, wherein nitrobenzenesulfonic acid is used as the nitro-aromatic sulfonic acid.

12. The process as claimed in claim 8, wherein nitrobenzenesulfonic acid is used as the nitro-aromatic sulfonic acid.

13. The process as claimed in claim 1 or 2, wherein xylene, chlorobenzene, o-dichlorobenzene, trichlorobenzene, chlorotoluene, nitrobenzene or nitrotoluene is used as the high-boiling, water-immiscible or only slightly water-miscible liquid.

14. The process as claimed in claim 12, wherein xylene, chlorobenzene, o-dichlorobenzene, trichlorobenzene, chlorotoluene, nitrobenzene or nitrotoluene is used as the high-boiling, water-immiscible or only slightly water-miscible aromatic liquid.

15. The process as claimed in claim 12, wherein nitrobenzene is used as the high-boiling, water-immiscible liquid.

* * * * *